(12) United States Patent
Valiyee et al.

(10) Patent No.: US 8,272,536 B2
(45) Date of Patent: Sep. 25, 2012

(54) BEVERAGE DISPENSING APPARATUS WITH BUTTERFLY PLATES AND A MOLDED O-RING RETAINER

(75) Inventors: Mojtaba Valiyee, Vacaville, CA (US); Juha K. Salmela, Citrus Heights, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 279 days.

(21) Appl. No.: 12/401,448

(22) Filed: Mar. 10, 2009

(65) Prior Publication Data

US 2009/0230148 A1    Sep. 17, 2009

Related U.S. Application Data

(63) Continuation-in-part of application No. 12/264,809, filed on Nov. 4, 2008, now Pat. No. 8,177,100.

(60) Provisional application No. 60/989,611, filed on Nov. 21, 2007.

(51) Int. Cl.
*B67D 7/06* (2010.01)

(52) U.S. Cl. ............... 222/144.5; 222/129.1; 222/132; 222/135; 222/139; 251/246; 62/390; 384/2; 384/613; 137/606

(58) Field of Classification Search ....... 222/129–129.4, 222/132, 134–135, 138–142, 144.5; 251/244–246; 62/389–390; 384/2, 610, 613, 615; 285/26, 285/137.1; 137/606
See application file for complete search history.

(56) References Cited

U.S. PATENT DOCUMENTS

| | | | | | |
|---|---|---|---|---|---|
| 926,427 | A | * | 6/1909 | Lacy | 248/118.5 |
| 3,220,524 | A | * | 11/1965 | Puidokas | 192/99 S |
| 4,084,330 | A | * | 4/1978 | Fraser | 34/92 |
| 4,497,421 | A | * | 2/1985 | Schilling | 222/144.5 |
| 4,986,449 | A | * | 1/1991 | Valiyee et al. | 222/144.5 |
| 5,042,692 | A | * | 8/1991 | Valiyee et al. | 222/144.5 |
| 5,343,798 | A | * | 9/1994 | Meisinger et al. | 92/130 A |
| 5,845,800 | A | * | 12/1998 | Shaw et al. | 220/210 |
| 6,036,170 | A | * | 3/2000 | Pitocco | 251/99 |

* cited by examiner

*Primary Examiner* — Kevin P Shaver
*Assistant Examiner* — Andrew P Bainbridge
(74) *Attorney, Agent, or Firm* — Kilpatrick Townsend & Stockton LLP

(57) ABSTRACT

The present invention provides improved retention of O-rings and easier O-ring replacement by using an O-ring retainer in a bar gun. Furthermore, the assembly of the butterfly plates of the bar gun is improved by using molded ball bearing clusters that fit in recesses in the butterfly plates, thus eliminating the welding of the balls to the butterfly plates and the need to purchase such precise and intricately small balls. The O-ring retainer and molded ball bearing cluster are preferably made from bearing quality acetal plastic materials.

21 Claims, 9 Drawing Sheets

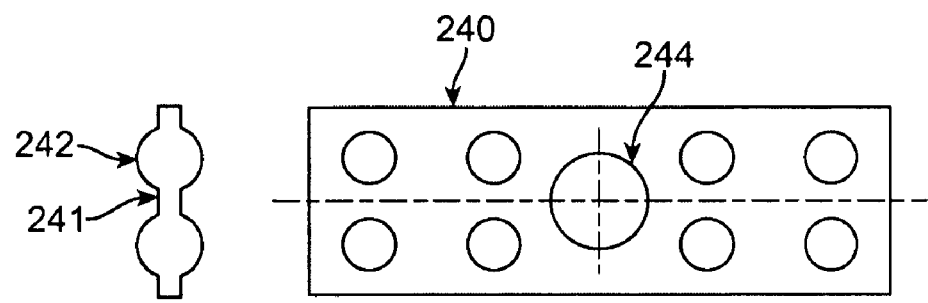
FIG. 3
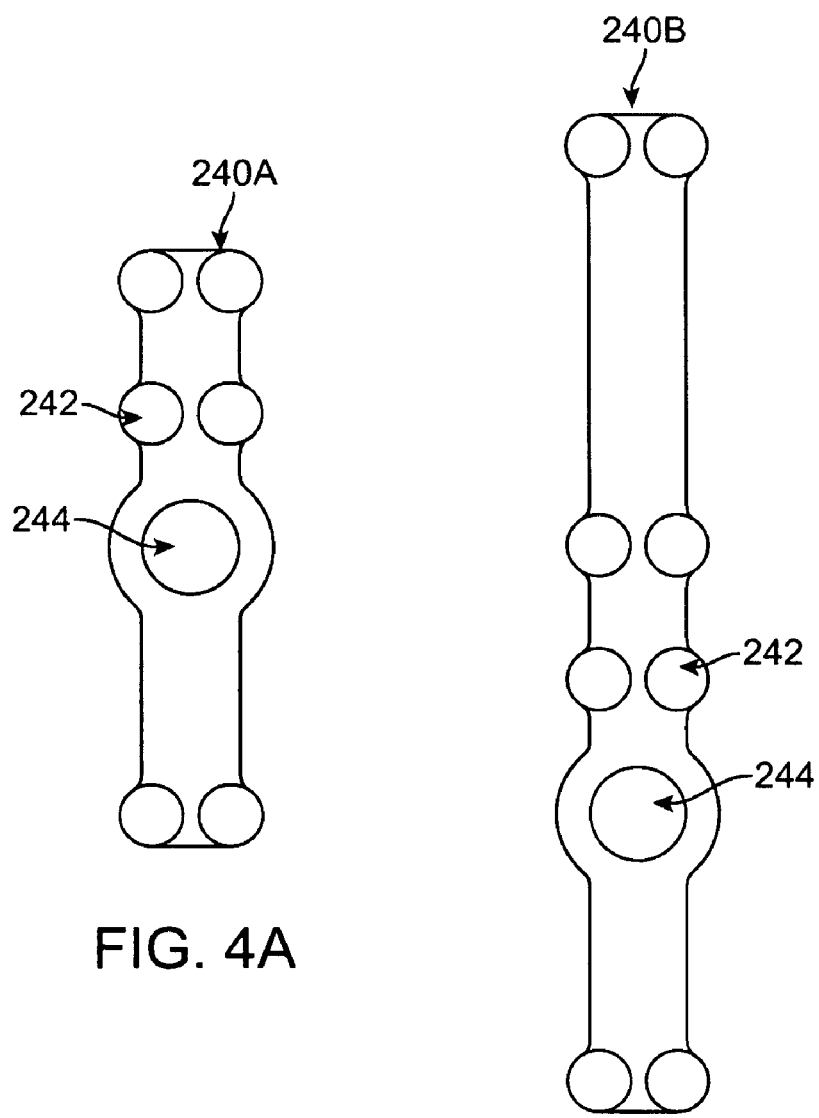
FIG. 4A
FIG. 4B

BEVERAGE DISPENSING APPARATUS WITH BUTTERFLY PLATES AND A MOLDED O-RING RETAINER

CROSS-REFERENCES TO RELATED APPLICATIONS

The present application is a continuation-in-part of U.S. patent application Ser. No. 12/264,809, filed on Nov. 4, 2008, now U.S. Pat. No. 8,177,100 on May 15, 2012, which claims benefit to U.S. Provisional Patent Application No. 60/989,611, filed on Nov. 21, 2007; all of which are incorporated herein by reference in their entireties.

BACKGROUND OF THE INVENTION

The present invention relates to a beverage dispensing apparatus of the type in which several different beverages are dispensed from a single beverage dispensing head by pressing an appropriate button. In particular, the present invention is related to improvements in the deployment of the butterfly plates in such a beverage dispensing apparatus.

Hand-held beverage dispensers which provide an operator with the ability to dispense a number of different beverages by merely pressing an appropriate button are known. Sometimes these hand-held dispensers are referred to as bar guns. One such bar gun system is described in the assignee's issued U.S. Pat. No. 4,986,449, entitled: "Beverage Dispensing Apparatus," the disclosure of which is hereby incorporated by reference. A feature of the apparatus of the '449 patent involves the use of butterfly plates to selectively actuate one or more valves for the dispensing of one or more base fluids or mixing fluids. As disclosed in the '449 patent, to maintain the butterfly plates in place on the abutment portion of the bar gun handle while allowing the plates to pivot, each butterfly plate includes a plurality of ball bearing projections which fit within corresponding cavities in the abutment. The ball bearing pivot points for the butterfly plates are quite small, thereby reducing friction and increasing leverage for an easier activation.

While the above-described beverage dispensing apparatus has proven to be extremely reliable and successful in operation, it is a rather complex device. For example, in the apparatus of the '449 patent the butterfly plates require the time-consuming and tedious welding of metal (e.g., steel) balls into complementarily-shaped recesses formed in the butterfly plates. In operation, when the assembled butterfly plate is pushed down to activate one or more valves, the ball joint turns on the acrylic bar gun handle imposing wear in the bar gun handle sockets that receive the ball. This can cause premature wear on the acrylic ball sockets. Moreover, sometimes the welding of the balls to the plates can leave burrs or flaws on the surface of the metal balls, either rendering the assembled plates useless, or creating further premature wear on the bar gun handle sockets that receive the balls. Furthermore, in the apparatus of the '449 patent the O-rings are not readily accessible for replacement and special tools must be used to access and replace them.

There is therefore a need to manufacture such a bar gun that does not suffer from the above shortcomings.

BRIEF SUMMARY OF THE INVENTION

The present invention improves the retention of O-rings and makes O-ring replacement easier by using an O-ring retainer in a bar gun. Furthermore, the assembly of the butterfly plates of the bar gun is improved by using molded ball bearing clusters that are shaped and dimensioned to fit in recesses in the butterfly plates, thus eliminating the welding of the balls to the butterfly plates and the need to purchase such precise and intricately small balls. The O-ring retainer and molded ball bearing cluster are preferably made from bearing quality acetal plastic materials. The ball bearing clusters are preferably made by molding bearing quality acetal plastic materials. The bearing material is less costly than the previously used metal balls and the ball bearing cluster will thus be the least costly wear item in the bar gun.

In one embodiment, an apparatus for dispensing a beverage of the type for use with pressurized sources of base and mixing fluids has a handle having a base fluid valve chamber and a mixing fluid valve chamber, each valve chamber having an entry cavity and an exit cavity, the entry cavity being positioned on one side of a valve chamber seat, and the exit cavity being positioned on the other side of the valve chamber seat; a base fluid valve stem disposed in the base fluid valve chamber and a mixing fluid valve stem disposed in the mixing fluid valve chamber, the base fluid valve stem and the mixing fluid valve stem each having a valve stem seat for a sealable engagement with a valve chamber seat in a valve closed position; an O-ring disposed around the valve stem to prevent fluid leaks between the valve stem and the valve chamber; an O-ring retainer configured to retain one or more O-rings in a sealable contact with the valve stem when the valve stem is actuated, while allowing an easy access to the one or more O-rings when the O-ring retainer is removed; a butterfly plate disposed over the base and mixing fluid valve stems, said butterfly plate being configured to bias the valve stems toward a valve open position upon a tactile input from an operator; means for biasing the base and mixing fluid valve stems toward the valve closed positions; and means for fluidly coupling the base and mixing fluid exit cavities to a discharge opening.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 3 is an exemplary drawing of the cluster bearing of FIG. 2.

FIGS. 4A-B are exemplary drawings illustrating a six-balls and an eight-balls configurations of ball clusters in accordance with the embodiments of the present invention.

DETAILED DESCRIPTION OF THE INVENTION

The present invention improves the retention of O-rings and makes O-ring replacement easier by using an O-ring retainer in a bar gun. Furthermore, the assembly of the butterfly plates of the bar gun is improved by using molded ball bearing clusters that are shaped and dimensioned to fit in recesses in the butterfly plates, thus eliminating the welding of the balls to the butterfly plates and the need to purchase such precise and intricately small balls. The O-ring retainer and molded ball bearing cluster are preferably made from bearing quality acetal plastic materials. The bearing material is less costly than the metal balls of the existing bar guns. Therefore, the ball bearing cluster will be the least costly wear item in the bar gun. Acetal plastic's benefits include a low coefficient of friction, high strength, low moisture absorption and easy machinability. It is a desirable material for applications with close-tolerance mechanical parts, such as FDA applications as well as for food service applications. Acetal plastics retain their toughness through a broad temperature range and are a good choice in wet environments.

Figure 1:
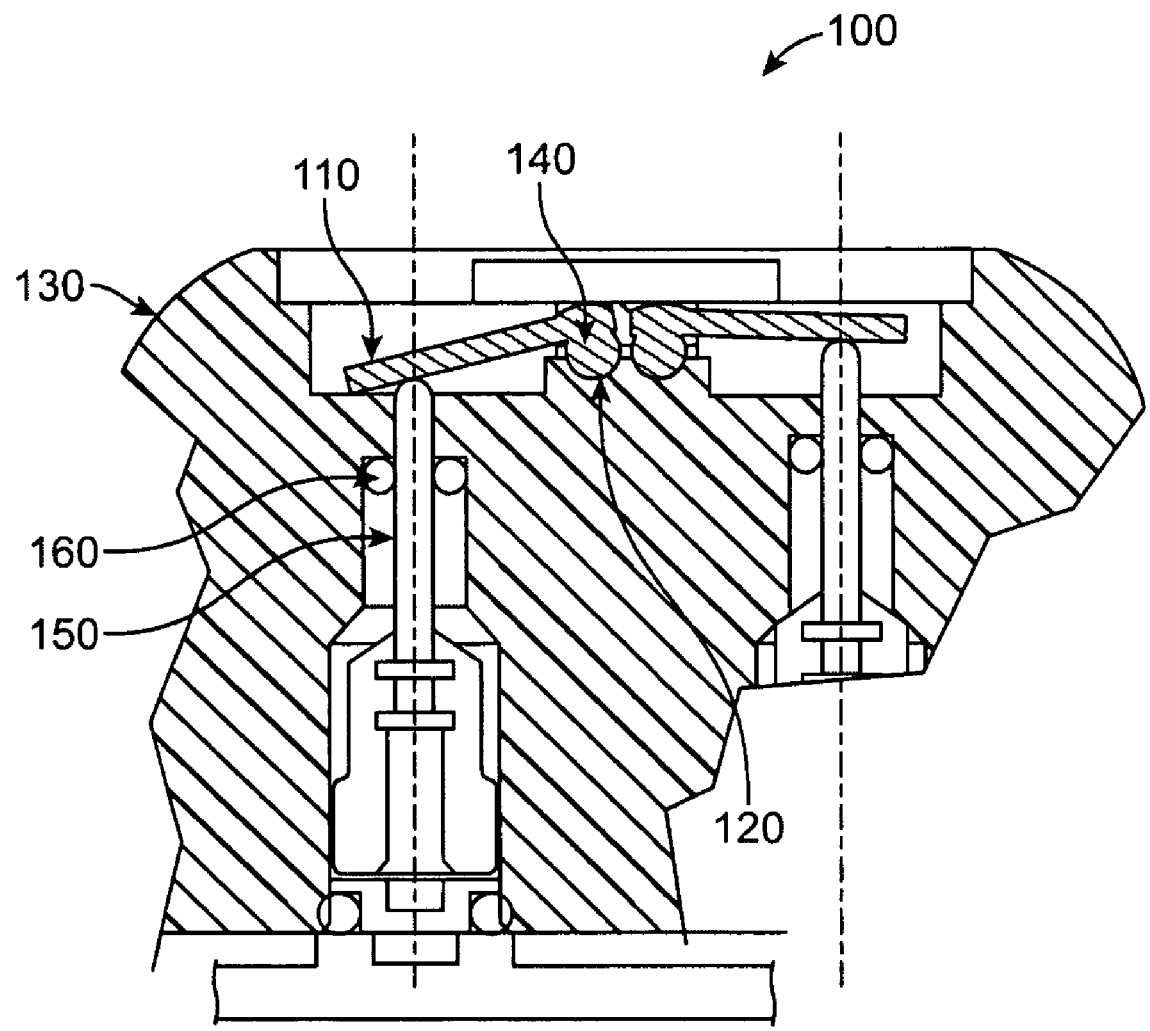
FIG. 1 illustrates a cross-sectional view of a prior art bar gun type beverage dispenser.

FIG. 1 illustrates a cross-sectional view of a prior art bar gun type beverage dispenser 100. As shown in FIG. 1, to maintain ball bearing 140 in place on abutment portion 120 of bar gun handle 130 while allowing the butterfly plates to pivot, each butterfly plate 110 is attached, e.g. brazed or welded, with ball bearing 140. When butterfly plate 110 is depressed or released, ball bearing 140 pivots in abutment portion 120 of bar gun handle 130. Thus, a wear surface exists where ball bearing 140 and abutment portion 120 mate. The ball bearing pivot points are quite small, thereby reducing friction between ball bearing 140 and abutment 120, and also increasing the butterfly plate leverage for an easier activation. However, since stainless steel ball bearing 140 is much harder than the mating plastic abutment portion 120 on bar gun handle 130, ultimately it will be the more expensive part, i.e. bar gun handle 130, that wears out and must be replaced.

FIG. 1 also shows valves 150 that are used to control the flow of base fluids or mixing fluids. O-ring 160 can be disposed around valve 150 to prevent base or mixing fluids leaking around the valve and further toward butterfly plate 110. However, O-ring 150 is disposed on the inside of handle 130. Therefore, either valve 150 should be removed first for the access to a defective O-ring or a special purpose tool should be had to remove a defective O-ring, both options being expensive and time consuming.

Figure 2A:
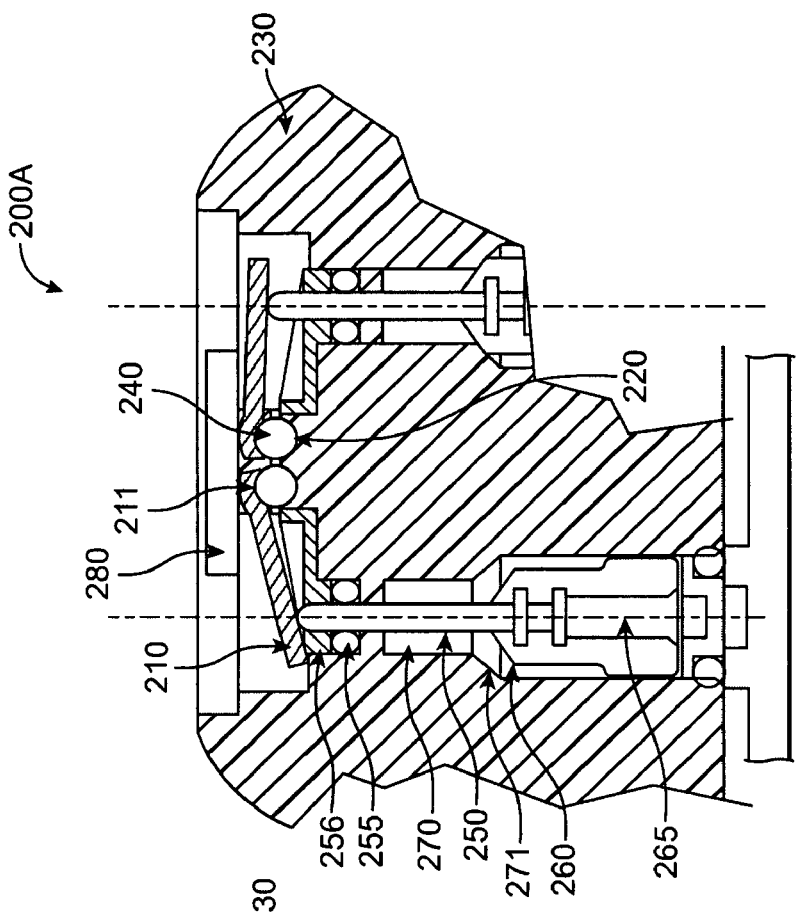
FIG. 2A is an exemplary cross-sectional view of a bar gun type beverage dispenser with butterfly plates, cluster bearings, and O-ring retainer in accordance with one embodiment of the present invention.
Figure 2:
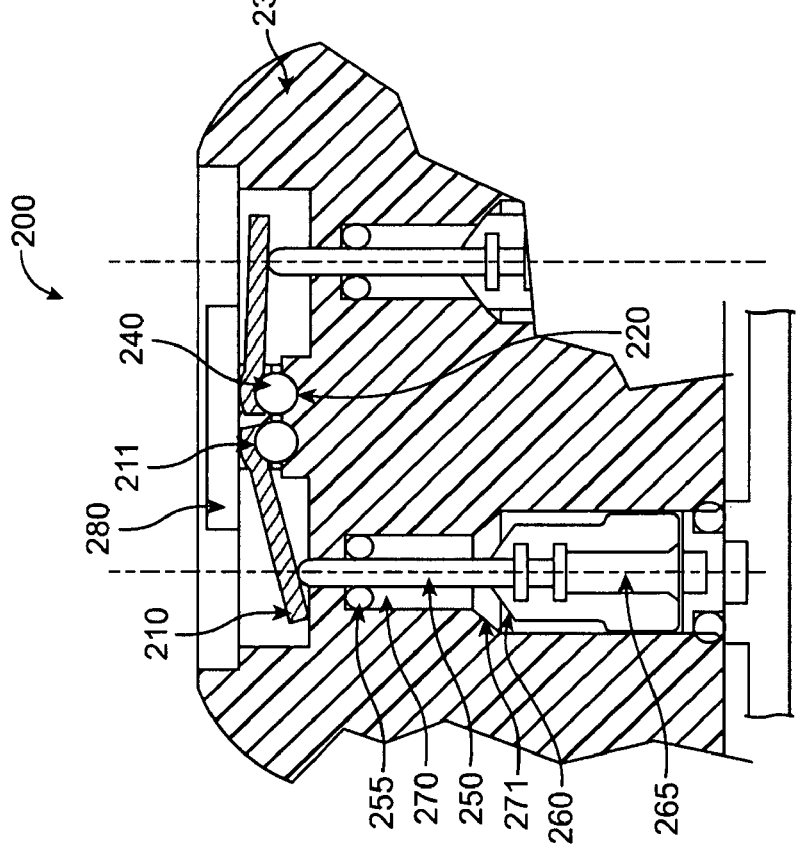
FIG. 2 is an exemplary cross-sectional view of a bar gun type beverage dispenser with butterfly plates and cluster bearings in accordance with one embodiment of the present invention.

FIG. 2 is a cross-sectional view of a bar gun beverage dispenser 200 with butterfly plates 210 and ball bearing cluster 240 in accordance with one embodiment of the present invention. As shown in FIG. 2, ball bearing cluster 240 can be used to operationally couple butterfly plates 210 with socket 220 on the interior surface of handle 230. Valve 265 is disposed in each valve chamber 270. When an operator depresses butterfly plate 210, valve stem 250 is pushed away from valve chamber seat 271 and into valve chamber 270, thus breaking the contact between valve stem seat 260 on valve stem 250 and valve chamber seat 271 on valve chamber 270, and opening a flow path for the base or the mixing fluid. Entry and exit chambers are fluidically connected with chamber 270, such that the entry chamber is configured on one side of valve chamber seat 271, and the exit chambers is configured on the other side of valve chamber seat 271.

Butterfly plate 210 has recess 211 which is configured and dimensioned to pivotably mate with a ball-shaped projection on ball bearing cluster 240. When depressed, butterfly plate 210 can pivot about the ball-shaped projection, while ball bearing cluster 240 stays in a substantially fixed position with respect to socket 220 of handle 230. Since there is no movement of ball bearing cluster 240 against socket 220 there is very little wear over the interior surface of handle 230. Therefore, the use of ball bearing cluster 240 is an improvement over the prior art design where precision stainless steel ball bearing 140 must be welded or brazed to the recess in butterfly plate 110, and where a wear-out surface is created between the stainless steel ball bearing 140 and abutment portion 120. Butterfly plates 210 can be held in place by retainer plate 280, which further assures that ball bearing cluster 240 stays in contact with socket 220 and butterfly plate 210.

FIG. 2A is a cross-sectional view of a bar gun beverage dispenser 200A with O-ring retainer 256 and ball bearing cluster 240 in accordance with one embodiment of the present invention. O-ring 255 prevents beverage leaks around valve stem 250 and further toward butterfly plate 210. O-ring 255 can be disposed around valve stem 250 outside of valve chamber 270. O-rings 255 can be held in place by O-ring retainer 256. Therefore, in order to gain access to O-ring 255, O-ring retainer 256 has to be removed, but valve stem 250 may stay in valve chamber 270, and the O-ring replacement can be accomplished without special tooling. Furthermore, O-ring retainer 256 provides an additional alignment surface for valve stem 250, thus reducing the wear out of handle 230 caused by miss-alignment of valve stem 250.

Figure 2B:
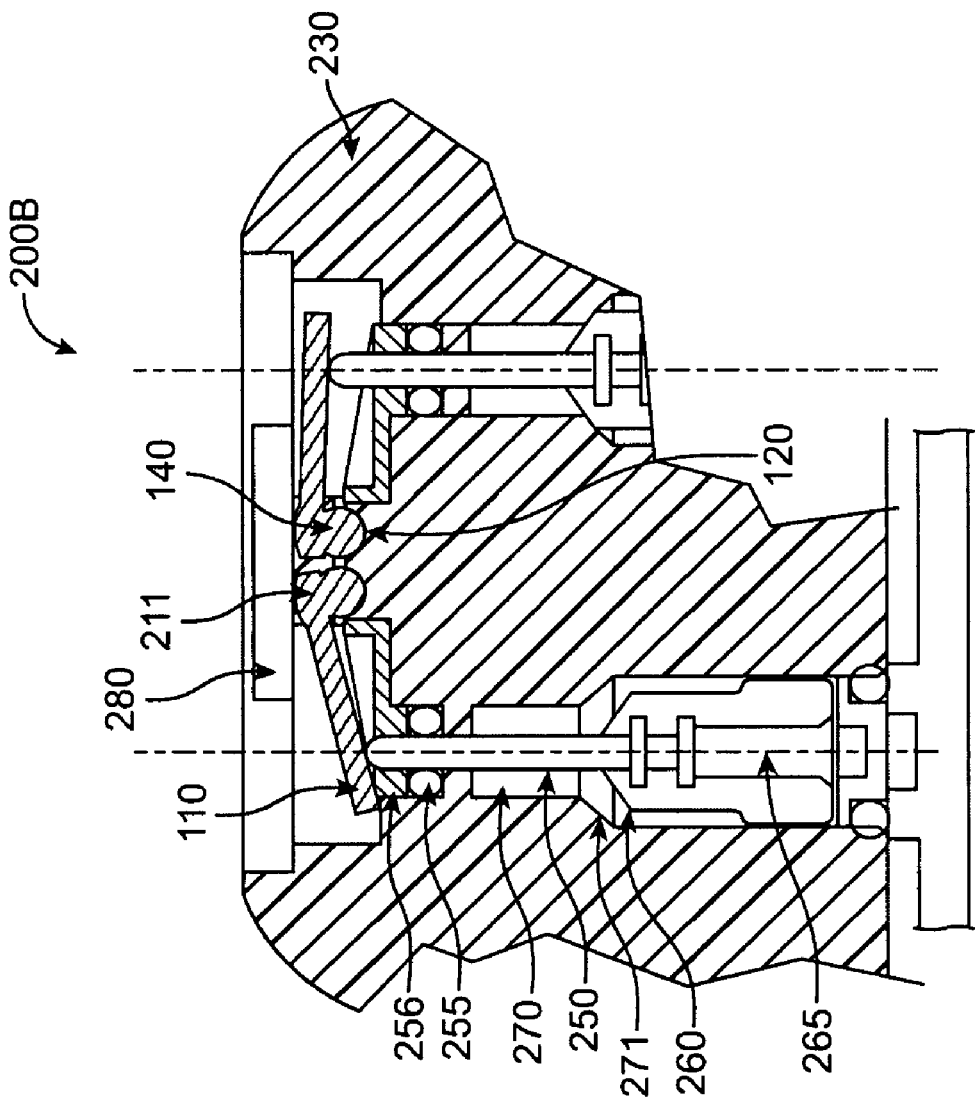
FIG. 2B is an exemplary cross-sectional view of a bar gun type beverage dispenser with butterfly plates and O-ring retainer in accordance with one embodiment of the present invention.

FIG. 2B is a cross-sectional view of a bar gun beverage dispenser 200B with O-ring retainer 256 in accordance with one embodiment of the present invention. Modified bar gun 200B includes O-ring retainer 256 which keeps O-rings 255 around valve stems 250 to prevent or minimize beverage leaks toward butterfly plates 210. Butterfly plate 110 having the attached ball bearing 140 pivots in the plastic abutment portion 120 on the bar gun handle.

FIG. 3 is an exemplary drawing showing a plan view and a side view of ball bearing cluster 240 of FIG. 2. As shown in FIG. 3, ball bearing cluster 240 has a plurality of ball-shaped projections 242, which are held at required locations by retaining sheet 241. A plate-like retaining sheet having uniform thickness is illustrated, but other retaining sheets are also possible, for instance a retaining sheet having non-uniform thickness or a retaining sheet having empty spaces. Ball bearing cluster 240 can also include aperture 244 for receiving a retaining fastener (not shown) which can hold retainer plate 280 against bar gun handle 230. Many different sizes of ball-shaped projections 242 are possible. One typical size is 0.094 inches in diameter. Ball bearing cluster 240 can be made from bearing quality acetal plastic material or other suitable material.

Different configurations of ball bearing cluster 240 can be used with different bar gun configurations, for example bar guns for 8, 10, 12 or 14 beverages. For example, a 10 beverage gun allows for the dispensing of 8 flavored mixed beverages, a plain water, and a plain soda dispensing. Likewise, a 12 beverage gun allows for the dispensing of 10 flavored mixed beverages, a plain water, and a plain soda, whereas a 14 beverage gun allows for the dispensing of 12 flavored mixed beverages, a plain water, and a plain soda. FIGS. 4A-B illustrate two exemplary configurations of ball bearing cluster 240 in accordance with the embodiments of the present invention. FIG. 4A shows ball bearing cluster 240A having 6 ball-shaped projections 242 and aperture 244. FIG. 4B shows ball bearing cluster 240B having 8 ball-shaped projections 242 and aperture 244. Multiple ball bearing clusters can be combined within one bar gun to achieve a desired configuration for beverage dispensing.

Figure 5:
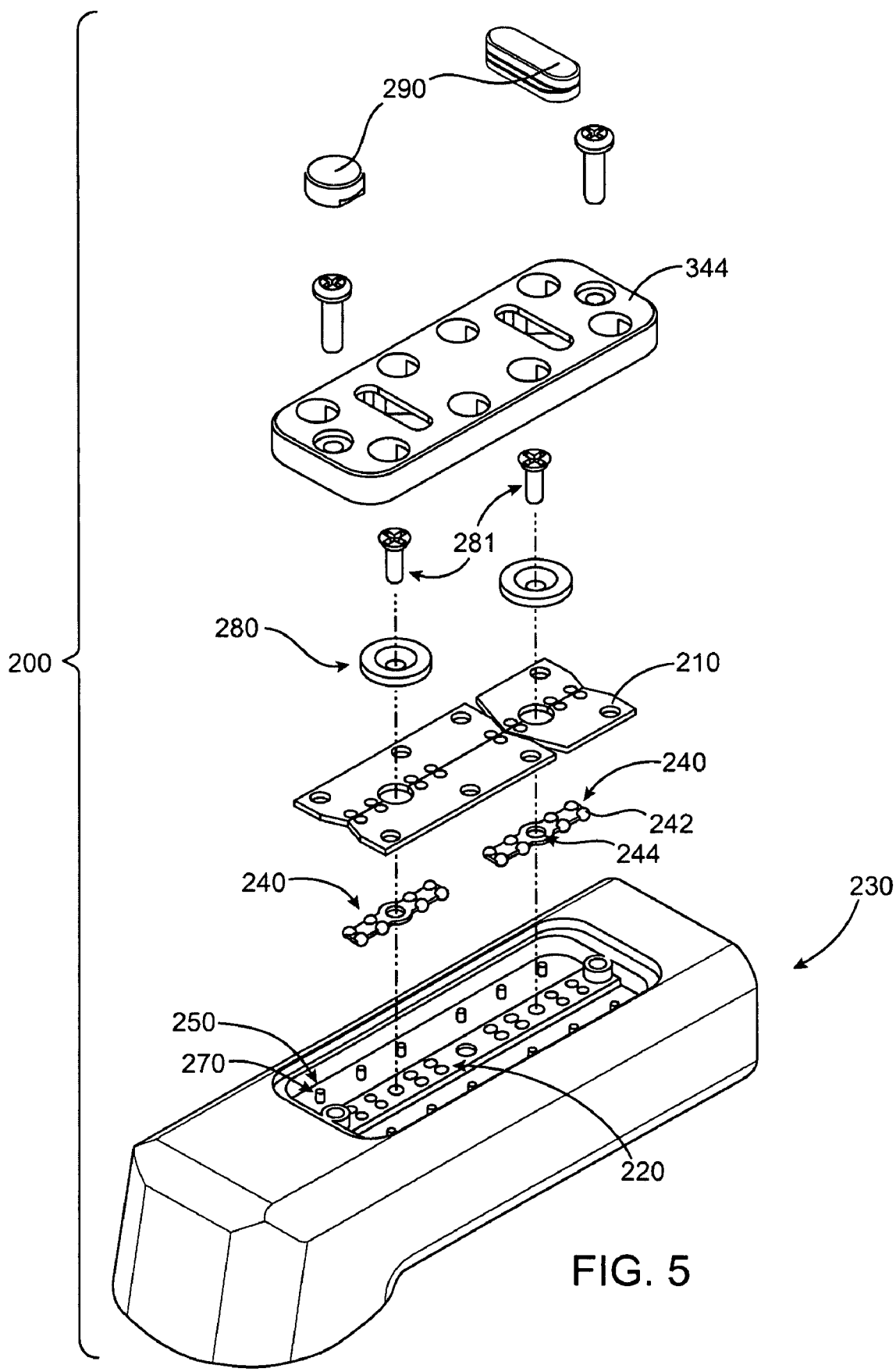
FIG. 5 shows an exploded view of a molded bar gun having cluster bearings in accordance with one embodiment of the present invention.

FIG. 5 shows an exploded view of a molded bar gun that can be used with the embodiments of the present invention. Bar gun 200 includes valve chambers 270 for receiving valve stems 250 and sockets 220 for receiving ball shaped projections 242. One or more ball bearing clusters 240 may mate against sockets 220 on handle 230. For example, two of the ball clusters shown in FIG. 4B may be used with handle 230 shown in FIG. 5, depending on the required configuration and number of the beverages to be dispensed. Other combinations are possible. FIG. 5 also illustrates that butterfly plates 210 can pivot around ball-shaped projections 242 when depressed against valve stems 250. Butterfly plates 210 may come in different sizes, thus covering different number of valve stems 250. Retainer plate 280 can be secured by retainer plate fastener 281 with handle 230 to keep ball bearing cluster 240 in contact with sockets 220 on the handle and with recesses 211 (shown in FIG. 2) on butterfly plates 210. Beverage button plate 344 can be secured with handle 230. Beverage button plate 344 can also house beverage buttons 290.

Figure 5A:
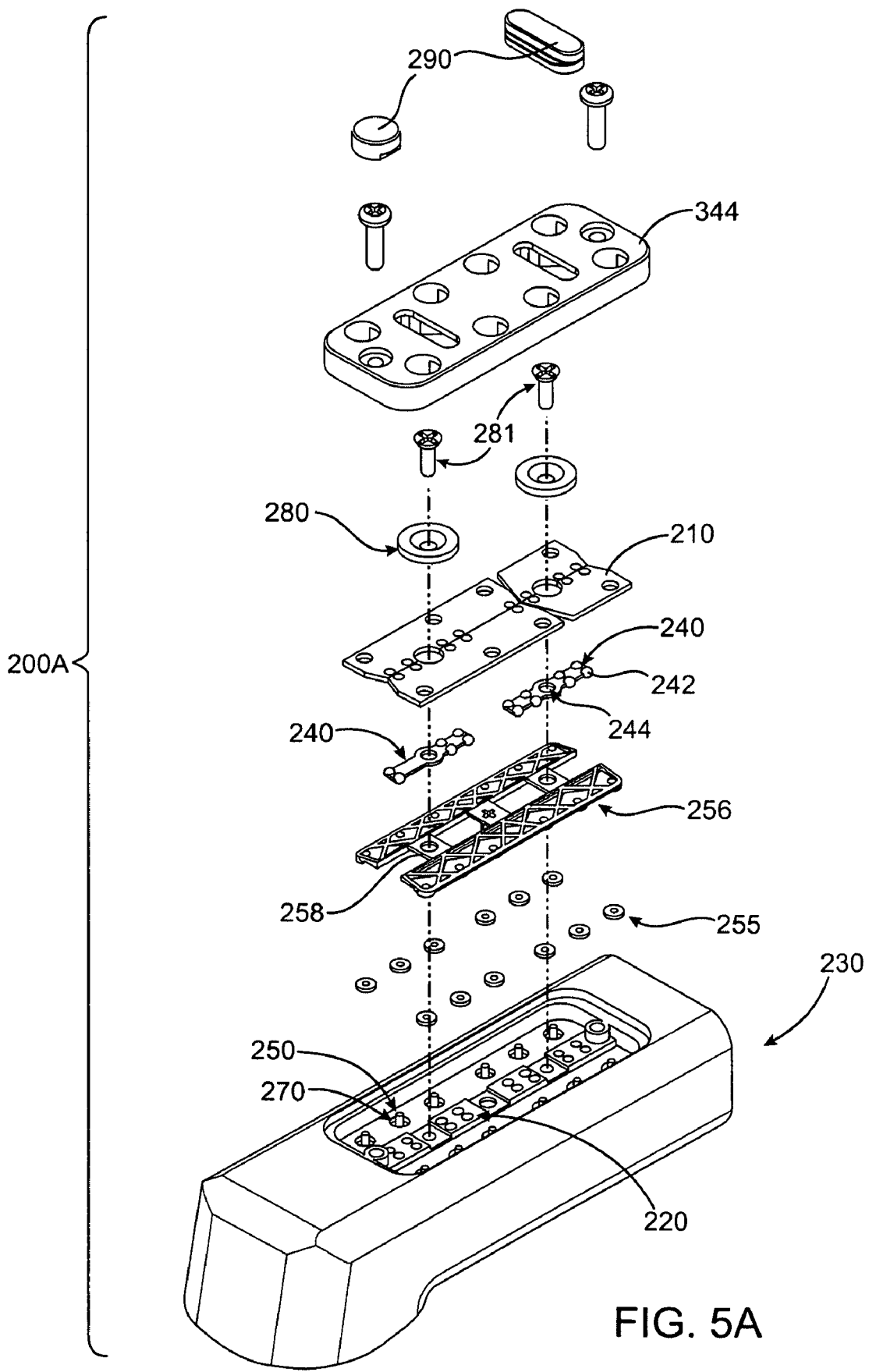
FIG. 5A shows an exploded view of a molded bar gun having cluster bearings and an O-ring retainer in accordance with one embodiment of the present invention.

FIG. 5A shows an exploded view of a molded bar gun that can be used with the embodiments of the present invention. Modified bar gun 200A includes O-ring retainer 256 which keeps O-rings 255 around valve stems 250 to prevent or minimize beverage leaks toward butterfly plates 210. Valve chambers 270 are sized to receive O-rings 255. The pressure from O-ring retainer 256 may deform O-rings 255, thus further improving sealing around valve stems 250. A single O-ring retainer 256 per bar gun is shown, but the embodiments with multiple O-ring retainers per bar gun are also possible.

Figure 5B:
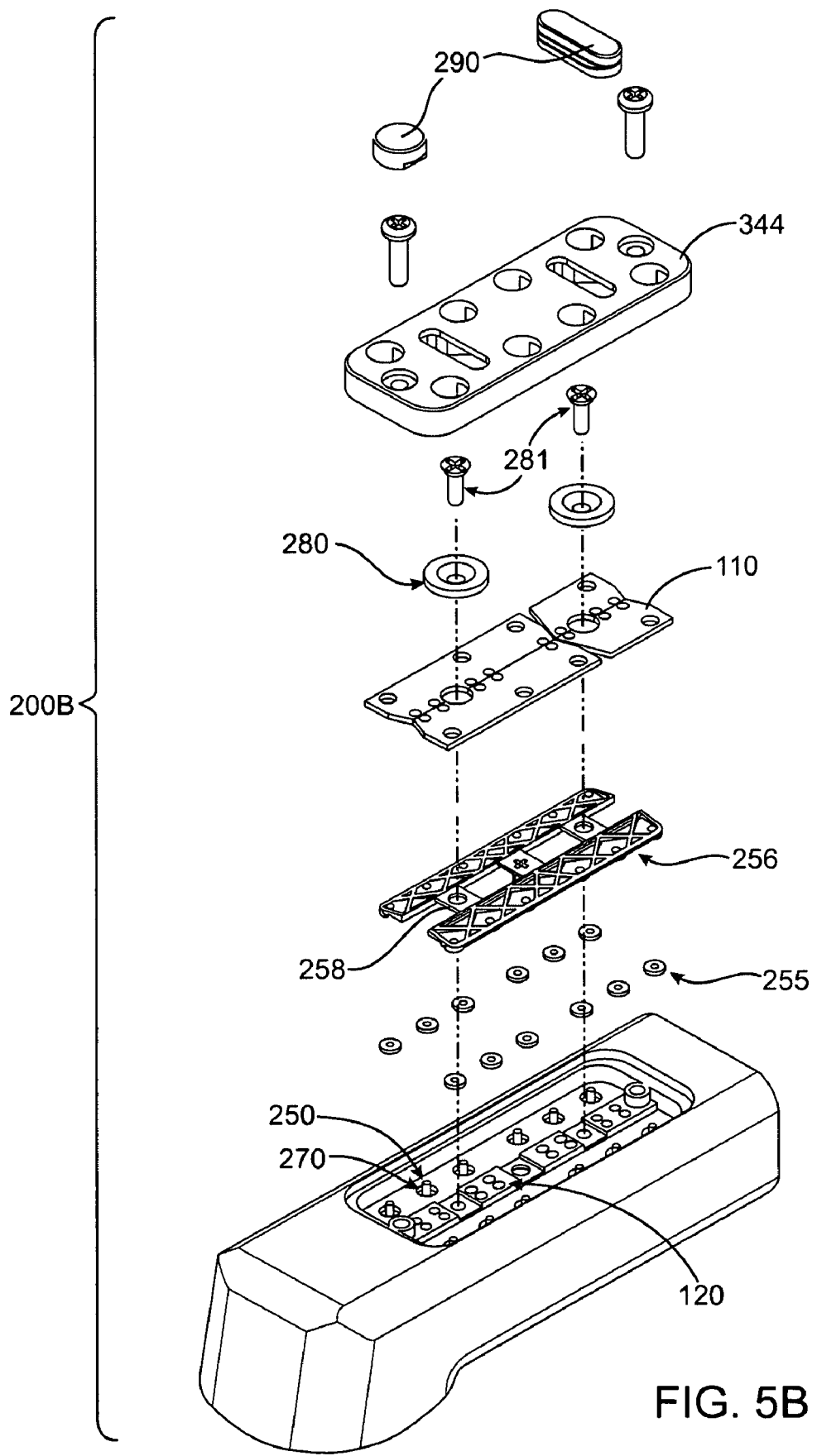
FIG. 5B shows an exploded view of a molded bar gun having an O-ring retainer in accordance with one embodiment of the present invention.

FIG. 5B shows an exploded view of a molded bar gun that can be used with the embodiments of the present invention. Modified bar gun 200B includes O-ring retainer 256 which keeps O-rings 255 around valve stems 250 to prevent or minimize beverage leaks toward butterfly plates 210. Butterfly plates 210 have the attached ball bearings 140 (not shown) that mate with plastic abutment portion 120 on the bar gun handle.

Figure 6:
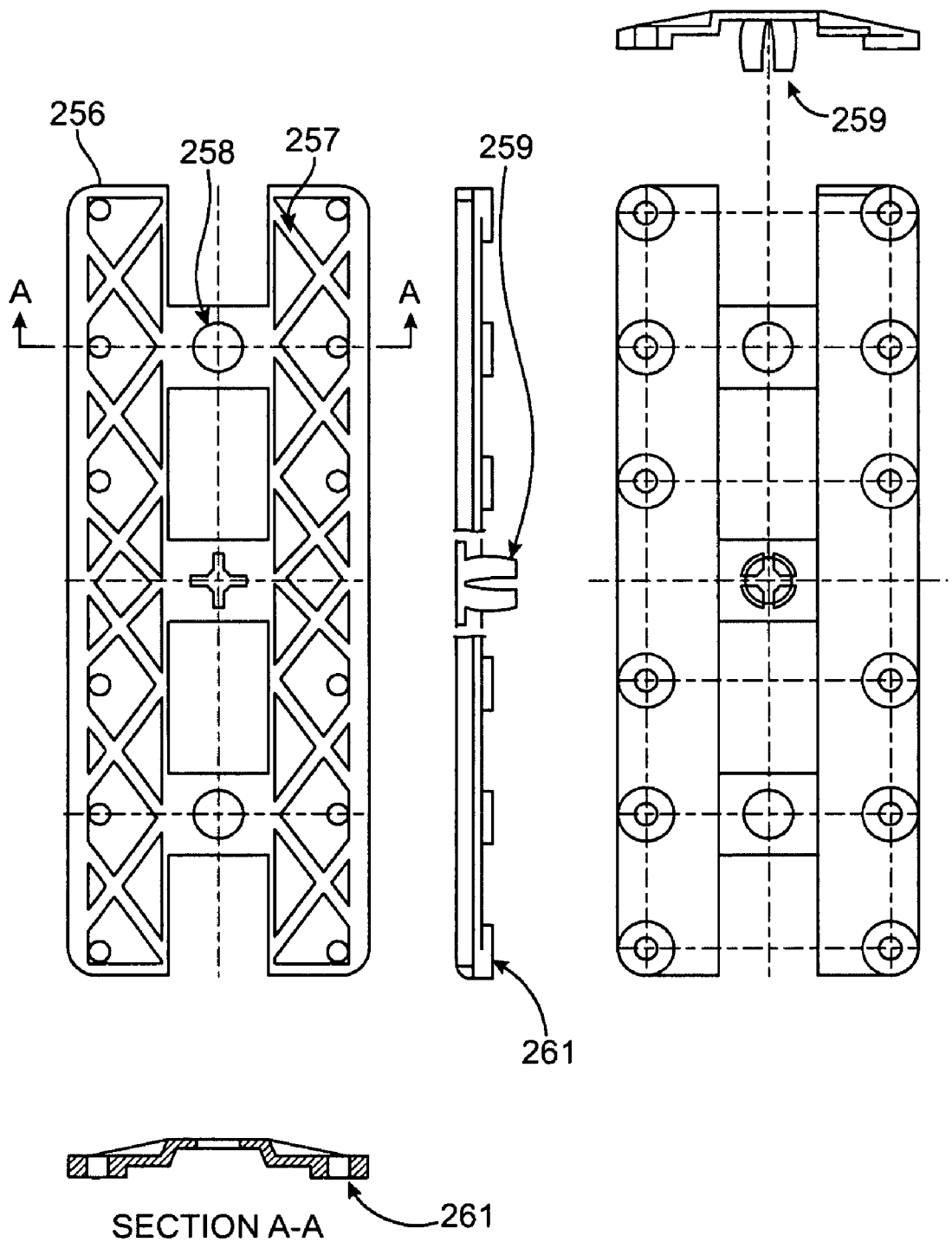
FIG. 6 illustrates an O-ring retainer constructed in accordance with one embodiment of the present invention.

FIG. 6 shows several views of O-ring retainer 256 constructed in accordance with one embodiment of the present invention. O-ring retainer apertures 258 can receive retainer plate fasteners 281 (shown in FIG. 5) that secure butterfly plate 210 against handle 230. A centrally located clip 259 can connect O-ring retainer 256 with handle 230. When O-ring retainer 256 connects with handle 230, a plurality of O-ring holding feet 261 disposed on one side of O-ring retainer 256 press against the O-rings. Consequently, the O-rings, which are disposed around valve stems 250 (see, e.g. FIG. 2A), deform and seal the opening around valve stems 250, thus preventing fluid leaks. FIG. 6 illustrates that ribs 257 may be used to provide for structural enforcement for O-ring retainer 256. O-ring retainer 256 can be molded from a bearing grade acetal plastic material, or other suitable materials known to those skilled in the art. The inventive O-ring retainer provides a significant improvement to the bar gun design in terms of serviceability, because it allows an easy access to O-rings 255 by simply lifting the O-ring retainer, instead of having to disassemble the gun as is presently done. O-ring retainer 256 also provides additional alignment for the valve stems. With the combination of the ball clusters and the O-ring retainer, the assembly of the bar gun is significantly improved.

Figure 7:
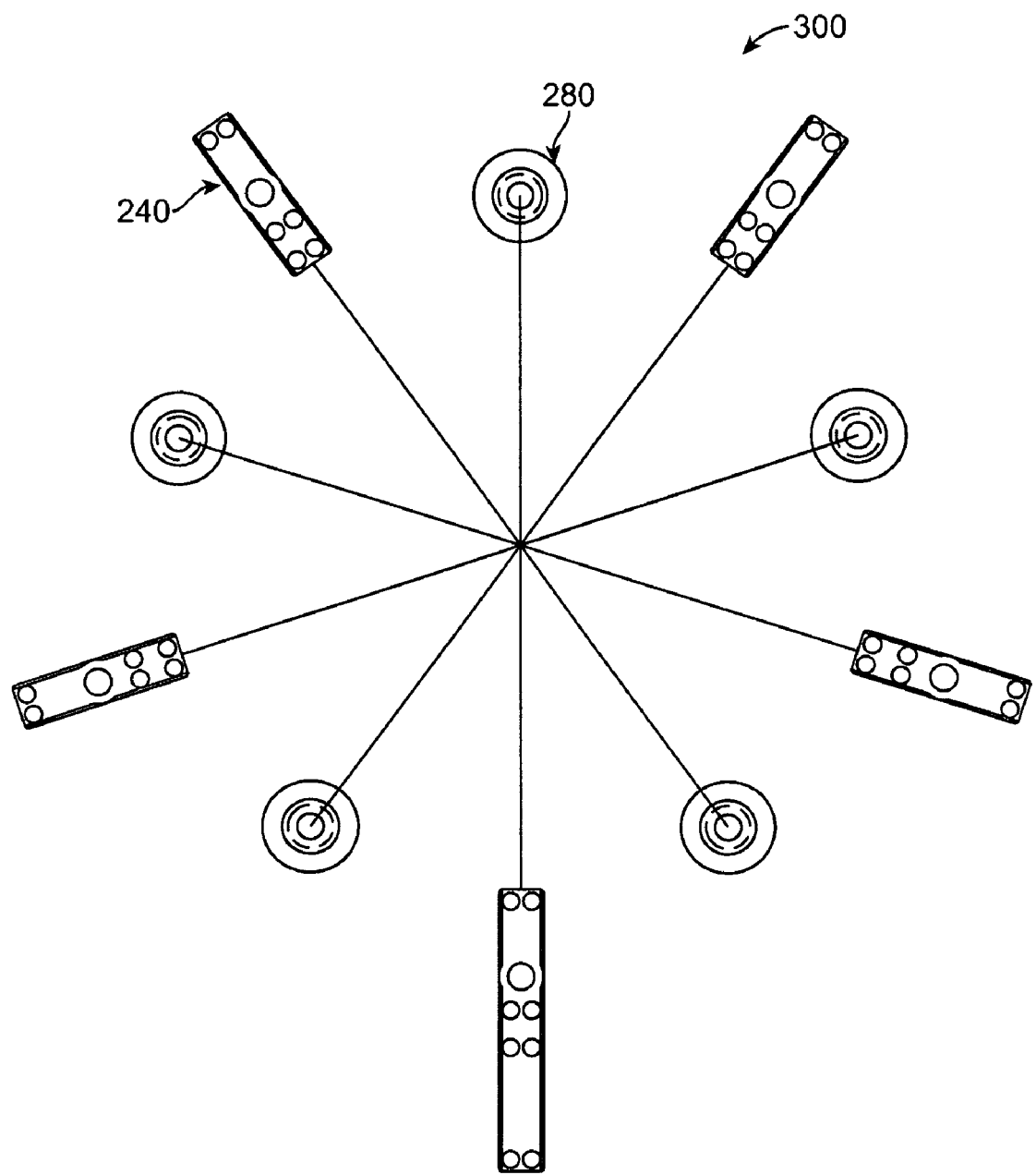
FIG. 7 illustrates an exemplary injection molding configuration for the making of the cluster bearings in accordance with one embodiment of the present invention.

FIG. 7 illustrates an exemplary injection molding configuration 300 for the manufacturing of the ball bearing clusters in accordance with one embodiment of the present invention. The arrangement of FIG. 7 enables a mold configuration that produces an appropriate quantity of parts for a bar gun in a single mold. FIG. 7 shows that the same mold may be used to produce retainer plates 280 that connect butterfly plate 210 with bar gun handle 230. By molding a proper ratio of retainer plates 280 versus ball bearing clusters 240, all the butterfly plate retainers and all the ball bearing clusters that are needed for a particular bar gun can be molded in one step.

As will be understood by those skilled in the art, the present invention may be embodied in other specific forms without departing from the essential characteristics thereof. For example, the ball bearing cluster may be used in dispensing tools other than the bar guns. The ball bearing cluster may have ball-shaped projections of various sizes or not distributed symmetrically along a centerline. Furthermore, the ball-shaped projections may be non-spherical. Many other embodiments are possible without deviating from the spirit and scope of the invention. These other embodiments are intended to be included within the scope of the present invention, which is set forth in the following claims.

What is claimed is:

1. An apparatus for dispensing a beverage, for use with pressurized sources of one or more fluids, comprising:
   a handle having at least one valve chamber, each valve chamber having an entry cavity and an exit cavity, the entry cavity being positioned on one side of a valve chamber seat, and the exit cavity being positioned on the other side of the valve chamber seat;
   a valve stem disposed in each valve chamber, each valve stem having a valve stem seat for a sealable engagement with a valve chamber seat in a valve closed position;
   an O-ring disposed around each valve stem;
   an O-ring retainer attached to the handle and configured to retain each O-ring in place around the valve stem, wherein the O-ring retainer is manually removable and manually replaceable to provide easy access to the O-ring without the need for tools;
   a butterfly plate disposed over each valve stem, said butterfly plate being configured to bias the valve stem toward a valve open position upon a manual input from an operator;
   means for biasing each valve stem toward the valve closed position; and
   means for fluidly coupling each exit cavity to a discharge opening.

2. The apparatus for dispensing a beverage as in claim 1, further comprising a ball bearing cluster sized and dimensioned to provide one or more pivot points for the butterfly plates.

3. The apparatus for dispensing a beverage as in claim 2, wherein said ball bearing cluster comprises a retainer and at least one ball-shaped projection projecting from the retainer, wherein the ball bearing cluster is configured such that the ball-shaped projection remains in a substantially fixed position and orientation with respect to both the retainer and the handle when one or more of the butterfly plates is pressed.

4. The apparatus for dispensing a beverage as in claim 2, wherein said ball bearing cluster comprises pairs of symmetrically aligned ball-shaped projections configured to provide pivot points for the pairs of symmetrically aligned butterfly plates.

5. The apparatus for dispensing a beverage as in claim 2, wherein said ball bearing cluster comprises an aperture located and dimensioned to receive a retaining fastener that is configured to bias a retainer plate towards one or more butterfly plates, thus keeping the butterfly plates in contact with the ball-shaped projections.

6. An apparatus for dispensing a beverage, for use with pressurized sources of one or more fluids, comprising:
- a handle having one or more valve chambers;
- a fluid valve disposed in each valve chamber, each said valve having a valve stem;
- one or more butterfly plates each configured to bias one or more of the valve stems towards a valve-open position when the butterfly plate is pressed, thus opening a fluidic communication from each of said pressurized sources of the fluids to a corresponding discharge opening;
- an O-ring disposed around each valve stem; and
- an O-ring retainer configured to retain the O-ring in place around the valve stem, the O-ring retainer comprising a clip configured such that the O-ring retainer can be manually attached to the handle, and manually removed from the handle to provide easy access to the O-ring.

7. The apparatus for dispensing a beverage as in claim 6, wherein the O-ring retainer further comprises an O-ring-holding foot configured to press each O-ring in an axial direction of the valve stem such that the O-ring is deformed to provide a seal to reduce or eliminate fluid leaks around the valve stem.

8. The apparatus for dispensing a beverage as in claim 6, further comprising a plurality of ribs configured to provide structural enforcement of the O-ring retainer.

9. The apparatus for dispensing a beverage as in claim 6, wherein the O-ring retainer is made of a bearing grade acetal plastic material.

10. The apparatus for dispensing a beverage as in claim 6, further comprising a ball bearing cluster sized and dimensioned to provide one or more pivot points for the butterfly plates.

11. The apparatus for dispensing a beverage as in claim 10, wherein said ball bearing cluster comprises a retainer and at least one ball-shaped projection projecting from the retainer, wherein the ball bearing cluster is configured such that the ball-shaped projection remains in a substantially fixed position and orientation with respect to both the retainer and the handle when one or more of the butterfly plates is pressed.

12. The apparatus for dispensing a beverage as in claim 6, further comprising one or more butterfly plate retainers being configured to connect the butterfly plates with the handle.

13. The apparatus for dispensing a beverage as in claim 6, wherein said handle comprises an inlet configured for connection to the pressurized sources of fluids, and an outlet for the fluids, and is further configured to transfer manual inputs from an operator onto the butterfly plates.

14. The apparatus for dispensing a beverage as in claim 6, further comprising means for biasing each valve stem toward a valve closed position.

15. The apparatus for dispensing a beverage as in claim 14, wherein each valve further comprise a valve stem seat configured to sealably engage with a valve chamber seat when said biasing means for biasing the valve stem toward the valve closed position overcomes the bias from the butterfly plate.

16. The apparatus for dispensing a beverage as in claim 15, wherein said valve stem seat and said valve chamber seat are substantially conically shaped and configured to mate with one another.

17. The apparatus for dispensing a beverage as in claim 6, wherein the fluid valves consist of 8, 10, 12, or 14 valves.

18. The apparatus for dispensing a beverage as in claim 10, wherein said ball bearing cluster is made by a molding process.

19. The apparatus for dispensing a beverage as in claim 18, wherein said ball bearing cluster is made of a bearing grade acetal plastic material.

20. The apparatus for dispensing a beverage as in claim 10, wherein said ball bearing cluster comprises pairs of symmetrically aligned ball-shaped projections configured to provide pivot points for the pairs of symmetrically aligned butterfly plates.

21. The apparatus for dispensing a beverage as in claim 10, wherein said ball bearing cluster comprises an aperture located and dimensioned to receive a retaining fastener that is configured to bias a retainer plate towards one or more butterfly plates, thus keeping the butterfly plates in contact with the ball-shaped projections.

\* \* \* \* \*